United States Patent
Sauerborn et al.

(10) Patent No.: US 9,726,401 B2
(45) Date of Patent: Aug. 8, 2017

(54) RECEIVER SYSTEM FOR A FRESNEL SOLAR PLANT

(71) Applicant: RIOGLASS SOLAR HOLDING, S.A., Asturias (ES)

(72) Inventors: Andreas Sauerborn, Stadtallendorf (DE); Tim Gnaedig, Mitterteich (DE); Thomas Kuckelkorn, Jena (DE); Tim Brengelmann, Munich (DE)

(73) Assignee: RIOGLASS SOLAR HOLDING, S.A., Asturias (ES)

( * ) Notice: Subject to any disclaimer, the term of this patent is extended or adjusted under 35 U.S.C. 154(b) by 431 days.

(21) Appl. No.: 14/305,571

(22) Filed: Jun. 16, 2014

(65) Prior Publication Data

US 2014/0360490 A1    Dec. 11, 2014

Related U.S. Application Data

(63) Continuation of application No. PCT/EP2012/074907, filed on Dec. 10, 2012.

(30) Foreign Application Priority Data

Dec. 16, 2011   (DE) .......................... 10 2011 088 829

(51) Int. Cl.
*F24J 2/54* (2006.01)
*F24J 2/12* (2006.01)
(Continued)

(52) U.S. Cl.
CPC ................. *F24J 2/12* (2013.01); *F24J 2/055* (2013.01); *F24J 2/07* (2013.01); *F24J 2/1047* (2013.01);
(Continued)

(58) Field of Classification Search
CPC .. F24J 2/16; F24J 2/07; F24J 2/18; F24J 2/54
(Continued)

(56) References Cited

U.S. PATENT DOCUMENTS 3,217,702 A * 11/1965 Miller .................. F24J 2/06
                                                                    126/680
4,011,855 A * 3/1977 Eshelman .............. F24J 2/1047
                                                                    126/660
(Continued)

FOREIGN PATENT DOCUMENTS

| CN | 1291275 A | 4/2001 |
| CN | 101839561 A | 9/2010 |

(Continued)

OTHER PUBLICATIONS

International Preliminary Report on Patentability dated Jun. 17, 2014 corresponding to PCT/EP2012/074907 with English translation, 10 pp.

(Continued)

*Primary Examiner* — Gregory Huson
*Assistant Examiner* — Nikhil Mashruwala
(74) *Attorney, Agent, or Firm* — Ohlandt, Greeley, Ruggiero & Perle, L.L.P.

(57) ABSTRACT

A receiver system for a Fresnel solar plant is provided that includes an absorber tube defining a longitudinal direction, a mirror array that runs parallel to the longitudinal direction and is used for concentrating light beams onto the absorber tube, and a support frame for the absorber tube and the mirror array. A first suspension for holding the absorber tube and a second suspension for holding the mirror array or at least parts of the mirror array are independently mounted on the support frame. The first suspension has first compensation device while the second suspension has second compensation device. The first and second compensation devices (Continued)

allow for different expansions of the absorber tube and the mirror array or at least parts of the mirror array in the longitudinal direction.

23 Claims, 13 Drawing Sheets

(51) Int. Cl.
*F24J 2/14* (2006.01)
*F24J 2/05* (2006.01)
*F24J 2/10* (2006.01)
*F24J 2/18* (2006.01)
*F24J 2/46* (2006.01)
*F24J 2/07* (2006.01)

(52) U.S. Cl.
CPC . *F24J 2/14* (2013.01); *F24J 2/18* (2013.01); *F24J 2/4636* (2013.01); *F24J 2002/108* (2013.01); *F24J 2002/109* (2013.01); *F24J 2002/1023* (2013.01); *Y02E 10/41* (2013.01); *Y02E 10/44* (2013.01); *Y02E 10/45* (2013.01)

(58) Field of Classification Search
USPC .................. 126/694, 685, 692, 696
See application file for complete search history.

(56) References Cited

U.S. PATENT DOCUMENTS

| | | | | |
|---|---|---|---|---|
| 4,246,891 A * | 1/1981 | Lambert | ................ | F24J 2/055 126/657 |
| 4,333,447 A * | 6/1982 | Lemrow | ................ | F24J 2/055 126/657 |
| 6,349,718 B1 * | 2/2002 | Ven | ................ | F24J 2/055 126/600 |
| 7,992,553 B2 * | 8/2011 | Le Lievre | ................ | F24J 2/07 126/569 |
| 8,430,093 B1 * | 4/2013 | Harris | ................ | F24J 2/12 126/683 |
| 2014/0360487 A1 * | 12/2014 | Sauerborn | ................ | F24J 2/14 126/651 |

FOREIGN PATENT DOCUMENTS

| | | | |
|---|---|---|---|
| DE | 10231467 A1 | 2/2004 | |
| JP | 2011190984 A * | 9/2011 | ............... F24J 2/14 |
| WO | 9942765 A1 | 8/1999 | |
| WO | 0212799 A2 | 2/2002 | |
| WO | 2009023063 A2 | 2/2009 | |
| WO | 2010100293 A1 | 9/2010 | |
| WO | 2011044281 A2 | 4/2011 | |

OTHER PUBLICATIONS

Written Opinion of the International Searching Authority dated Nov. 5, 2013 corresponding to PCT/EP2012/074907 with English translation, 8 pp.

International Search Report dated Nov. 5, 2013 corresponding to PCT/EP2012/074907 with English translation, 7 pp.

International Search Report dated Oct. 5, 2013 corresponding to PCT/EP2012/074907, 1 pp.

Morin, et al., "Supernova—Construction, Control & Performance of Steam Superheating Linear Fresnel Collector", 6 pp. 2011.

* cited by examiner

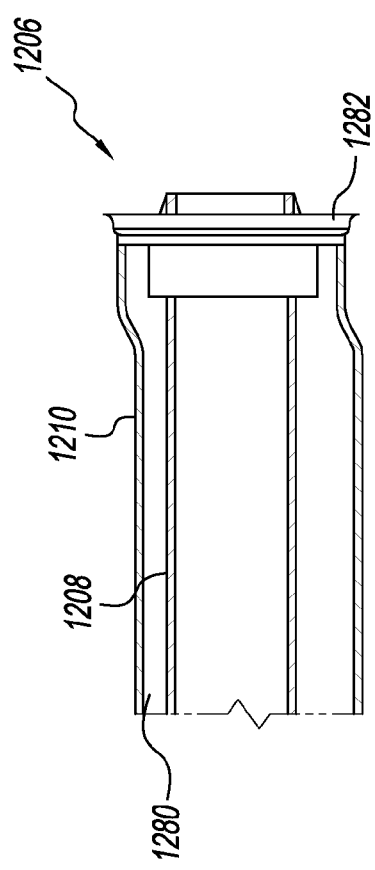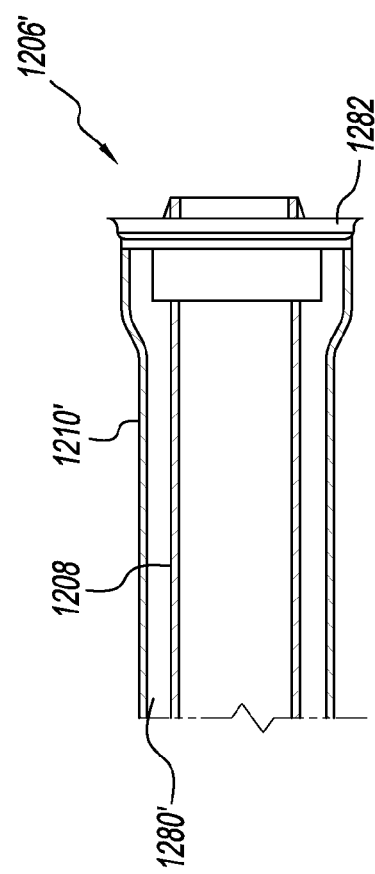

RECEIVER SYSTEM FOR A FRESNEL SOLAR PLANT

CROSS REFERENCE TO RELATED APPLICATIONS

This application is a continuation of International Application No. PCT/EP2012/074907 filed Dec. 10, 2012, which claims the benefit under 35 U.S.C. §119(a) of German Patent Application No. 10 2011 088 829.2, filed Dec. 16, 2011, the entire contents of which are incorporated herein by reference.

BACKGROUND OF THE INVENTION

1. Field of the Invention

The invention relates to a receiver system for a Fresnel solar plant having an absorber tube defining a longitudinal direction, a mirror array parallel to the longitudinal direction as a secondary concentrator for the concentration of light beams on the absorber tube, and a support frame for the receiver tube and the mirror array.

2. Description of Related Art

The generic receiver system is part of a solar power plant, which has, in addition, a primary concentrator in the form of a field of rows of mirrors mounted in parallel close to the ground, which concentrate solar rays onto the receiver system that are then projected once more by its mirror array, concentrated onto the absorber tube. For this purpose, the receiver system is found at a height of several meters above the primary-concentrator mirror array. Depending on the collector design in each case, such plants that are 4 m to 30 m high are known. The secondary concentrator has a suitable curve profile and projects the radiation downward onto the absorber tube disposed thereunder at the shortest possible distance. A heat-transfer fluid that is heated to several 100° C. by the concentrated light radiation passes through the absorber tube. The heat can be used, for example, for generating current or as process heat.

In the last several years, these types of Fresnel solar plants have been found in an accelerated phase of development. More recent documents on this subject are, for example, the article "Supernova—Construction, Control & Performance of Steam super heating linear Fresnel-Collector", Gabriel Morin et al., Solar Paces Conference 2011, Book of Abstracts, and the Offenlegungsschriften (Unexamined Patent Applications) WO 2010/100293 A1 and WO 99/42765 A1.

For achieving a high efficiency, among other things, the optical geometric configuration of the mirrors and of the absorber tube is a basic prerequisite, in addition to the surface quality of the optical components of the mirror and of the absorber tube, which has been the subject of numerous inventions. The present subject of the invention thus particularly addresses the adjustment of the mirror array and of the receiver tube, which has been given little attention in the past.

The receiver system is subjected in part to very high and overall very different temperature fluctuations and environmental influences over a daily cycle.

The object of the invention is to configure the solar plant by an improved construction to be less sensitive to temperature fluctuations and environmental influences and thus finally also to increase its efficiency and service life.

SUMMARY

In a receiver system of the type named initially, on the support frame according to the invention there are mounted, independent of one another, a first suspension for holding the absorber tube and a second suspension for holding the mirror array or at least parts of the mirror array, the first suspension having first compensation means and the second suspension having second compensation means, and the first and second compensation means permit different expansions of the absorber tube and of the mirror array in the longitudinal direction.

The invention is based on the knowledge that the absorber tube, on the one hand, and the mirror array, on the other hand, are subject to different temperature fluctuations. Further, the two components are manufactured of different materials, so that they expand differently during operation. Since the solar plant is typically several 100 meters long, the longitudinal expansion of the absorber tube that is heated the most intensely can amount to several meters. However, the mirrors also expand to a significant extent due to the heating, but this expansion is different than that of the absorber tube. In addition, it should be taken into consideration that the absorber tube extends continuously over the entire length of the solar plant, while the mirror array is divided into individual segments over the entire length.

The first compensation means and the second compensation means each offer one degree of freedom essentially in the longitudinal direction, so that an independent expansion of the absorber tube and the mirror array can be equilibrated. In this way, deformations of the mirror surfaces are effectively avoided, particularly with use of aluminum mirrors.

As will become clear based on the examples of embodiment given below, the degrees of freedom permit, in addition to a linear compensation movement, also a curved compensation movement, in particular a circular compensation movement, for example, by a connection to a rotating joint, whereby, however, only the tangential component of the compensation movement running in the longitudinal direction matters. In this sense, one speaks herein of one degree of freedom "essentially in the longitudinal direction".

According to an advantageous embodiment of the invention, the receiver system has a receiver tube, composed of the absorber tube and a sleeve tube disposed around the absorber tube, at least in segments.

It thus involves a vacuum receiver, in which the intermediate space between absorber tube and receiver tube is evacuated for thermal insulation and for protection of the surfaces of the absorber tube. Since the absorber tube and the sleeve tube surrounding the latter are subjected to different thermal conditions and since the absorber tube is composed of metal, but the sleeve tube is composed of glass, the two tubes expand to differing degrees. The sleeve tube is thus segmented, and compensation elements, usually in the form of expansion bellows, are provided in the known way between each sleeve tube segment and the absorber tube, the bellows fixing the sleeve tube in the compensation direction in a movable manner, but otherwise as rigidly as possible on the absorber tube. The sleeve tube is thus mounted above the absorber tube and the first suspension on the support frame and follows the compensation movement thereof. The compensation elements between the sleeve tube segments and the absorber tube serve only for the compensation of a relative movement between the two. Such a vacuum receiver arrangement is described, for example, in the Patent Application DE 102 31 467 A1.

The support frame preferably has a longitudinal support member running parallel to the absorber or receiver tube and to the mirror array, on which is mounted the first suspension.

Particularly preferred, the longitudinal support member is disposed above the absorber or receiver tube and the mirror array.

The mirror array appropriately has at least one opening through which the first suspension is guided from the longitudinal support member to the absorber tube.

An advantageous enhancement of the invention provides that the mirror array has separate first and second mirror elements in the longitudinal direction, with a gap lying therebetween.

A mirror array separated into at least two mirror elements has a ventilation opening in the shape of this gap and can thus counteract a heat buildup in the upper part of the mirror array. If the first suspension is guided from the longitudinal support member through an opening in the mirror array to the receiver tube, the gap preferably also forms this opening. In this way, the first suspension for holding the receiver or absorber tube can execute an unrestricted relative movement opposite the mirror array in the longitudinal direction, without colliding with the mirror array.

Preferably, the mirror array has a first and a second profile element, each of these being associated with the first or second mirror element and housing the associated mirror element on its side facing away from the receiver or absorber tube.

Up until now, a housing has been known only for the entire receiver system, within which both the mirror array as well as the receiver tube and bearing parts are disposed. The purpose of the housing is to protect the receiver system from environmental effects and dust. The profile elements associated with the individual mirror elements also fulfill the same purpose, but with the advantage that they offer an individual protection of the individual mirror elements and thus can be moved together with them, each time depending on what is required. Thus, the first and second profile elements are preferably also attached to the second suspension.

The first and second mirror elements are each advantageously fixed to the associated first and second profile elements at least on one side by means of compensation means that permit in turn, different expansions of the mirror elements and the associated profile elements in the longitudinal direction. In this way, a further expansion compensation is created for the differently heated mirror elements and profile elements.

In an advantageous, since it is cost effective, variant of embodiment, the first and second profile elements are configured L-shaped.

In order to avoid radiation losses as much as possible, the mirror array has a mirror segment that at least partially optically closes the gap between the first and second mirror elements.

This can be achieved preferably either in that the mirror segment is formed as a third mirror element and that the mirror array has a third, preferably U-shaped profile element associated with the third mirror element, which houses the third mirror element on its side turned away from the absorber tube.

In this case, the third profile element is preferably fastened to the first suspension. In this way, the absorber or receiver tube, together with the first suspension and the central third mirror element with profile element forms a cohesive unit independent from the second mirror element with its profile element, the expansion of this unit being completely decoupled from that of the second mirror element.

Since the third mirror element as well as the associated third profile element in turn are also subjected to different temperatures and thus different longitudinal expansions, it has proven to be advantageous to fix the third mirror element to the associated third profile element, at least on one side, by means of compensation means, which permit different expansions of the third mirror element and the associated profile element in the longitudinal direction.

If "at least parts of the mirror array" is stated herein, then at least the two outer-lying first and second mirror elements and, insofar as they are present, their associated profile elements, is meant.

Alternatively, the mirror segment is formed as a reflective surface of the sleeve tube. Such a variant is basically known from the Offenlegungsschrift (Unexamined Patent Application) WO 2010/100293 A1, but serves another purpose therein, namely to bring the mirror array of the receiver system as close as possible to the absorber tube, in order to utilize the radiation loss that otherwise would pass unused through the intermediate space between the absorber tube and the mirror.

Regardless of the configuration of the mirror segment as the third mirror element or as the reflective surface of the sleeve tube, an air gap preferably remains in each case between the first mirror element and the mirror segment and between the second mirror element and the mirror segment.

The air gap in the region between the mirror segment and the two mirror elements permits a discharge there of the built-up hot air, so that both the mirror elements as well as the mirror segment are not heated unnecessarily.

Preferably, the mirror array has a mirror-symmetrical curve profile with at least one, but preferably two top-lying apical points, the air gaps being disposed in each case in the region of the one or more apical point(s).

This ensures that the heated air can escape from the highest point and that a higher-lying dead volume is not formed. Here, "in the region of the apical point" is to be understood in that the air gaps can be found also a little below the highest point of the curve profile. A region of 10% of the total height of the curve profile beneath the top-lying apical point is given as the preferred position of the air gaps.

Particularly preferred, as the second compensation means, the second suspension has a first joint, which connects the support frame on one side to the mirror array on the other side, and defines one degree of freedom in the longitudinal direction. Basically, the movable connection of two relatively rigid units is understood herein as a joint.

The first joint is preferably formed as a solid joint. In this embodiment, the joint can be formed by a monolithic solid that is flexible, however, due to its flat cross section. This form of the joint has the advantage that there is no friction between two joint parts that are movable relative to one another and that the suspension thus is less sensitive to wear and maintenance in the case of small deflections.

As a first compensation means, the first suspension preferably has a roller or slider bearing assembly, in particular in the form of a trolley, which is disposed so that it can travel along the longitudinal support member.

This form of the expansion compensation is particularly appropriate based on the considerable longitudinal expansion of the absorber tube.

In a particularly preferred embodiment of the invention, the second suspension has a second joint, which connects the support frame on one side to the mirror array or to parts of the mirror array on the other side and defines one degree of freedom crosswise to the longitudinal direction.

Such a joint serves for the purpose that the mirror array or at least parts thereof can be moved in the lateral and/or vertical direction relative to the absorber or receiver tube, but is connected to the latter in a captive manner via the support frame. It makes it possible, for purposes of maintenance of the absorber or receiver tube, to be able to move the mirror array away from the latter in a simple and defined way, and to move it back again into the exact set position.

In particular, the second joint is advantageously a rotating joint for swinging out the mirror array or at least parts of the mirror array.

According to another advantageous embodiment, the sleeve tube is disposed eccentrically around the absorber tube, at least on a central longitudinal segment.

Such an embodiment is known basically also from Offenlegungsschrift (Unexamined Patent Application) WO 2010/100293 A1. The eccentric arrangement serves here as well as therein for a higher yield of the reflected light radiation or a smaller loss of light rays passing through the intermediate space between the absorber tube and the mirror array.

Alternatively or additionally, for this purpose, the sleeve tube is tapered, preferably at least on a central longitudinal segment. This measure also serves for reducing the gap between the absorber tube and the sleeve tube, so that the mirror array can be arranged at a short distance to the absorber tube.

DESCRIPTION OF THE DRAWINGS

Additional features and advantages of the invention will be explained on the basis of embodiment examples, which are shown in the figures described below. Herein:

FIG. 12A shows a lateral view of a first embodiment of the receiver tube with eccentric arrangement of the sleeve tube;

FIG. 12B shows a lateral view onto a second embodiment of the receiver tube with tapered sleeve tube.

DETAILED DESCRIPTION

Figure 1:
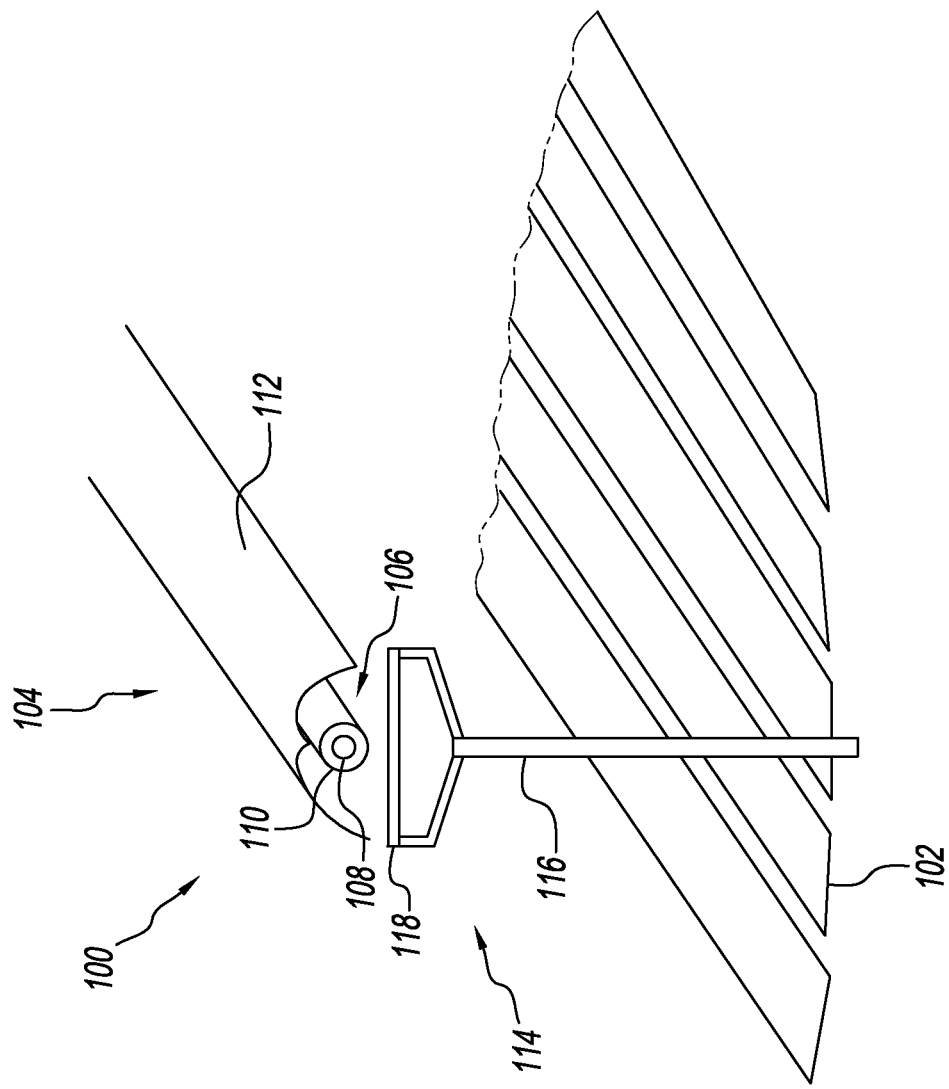
FIG. 1 shows a schematic representation of the initial situation that was the basis for the invention.

The initial situation in order to explain the problem that is the basis of the invention is sketched in FIG. 1, based on a schematic representation of a Fresnel solar plant 100. This plant has a field of parallelly aligned primary concentrator mirrors 102, which are mounted close to the ground and are aligned on a receiver system 104 in such a way that the solar beams striking the primary concentrator mirrors 102 are reflected from them essentially upward and reach the detection region of the receiver system 104 as much as possible without loss. The receiver system 104 essentially has three functional components, namely a receiver tube 106, which in turn is composed of an absorber tube 108 and a sleeve tube 110 disposed around the absorber tube 108, at least in segments, in the longitudinal direction; a mirror array 112, which is parallel to the longitudinal direction, as a secondary concentrator for the concentration of the light rays reflected from the primary concentrator onto the absorber tube 108; and a support frame 114, which is shown here greatly simplified, with a support post 116 and a crosswise support 118.

Proceeding from here, the invention is concerned with the question of how such a receiver tube 106 and a mirror array 112 can be fastened to the support frame 114, whereby the fastening provides sufficient degrees of freedom for the compensation of different length expansions of the individual components. Up until now, both the receiver tube as well as the mirror array have been accommodated in a common housing, which is disposed like a roof over the mirror array, protecting it from weather effects. Inside the housing, common holders engage the receiver tube and the mirror array from above and fix them in place. These holders also, in fact, permit a compensation movement in the longitudinal direction, but only a common movement for both the receiver tube and the mirror array. In order to do justice to the very different longitudinal expansions, the mirrors of the mirror array are fixed only on one side and are guided only on the other side. However, this has not led to reliable movements of the components and regularly leads to an optical maladjustment.

Figure 2:
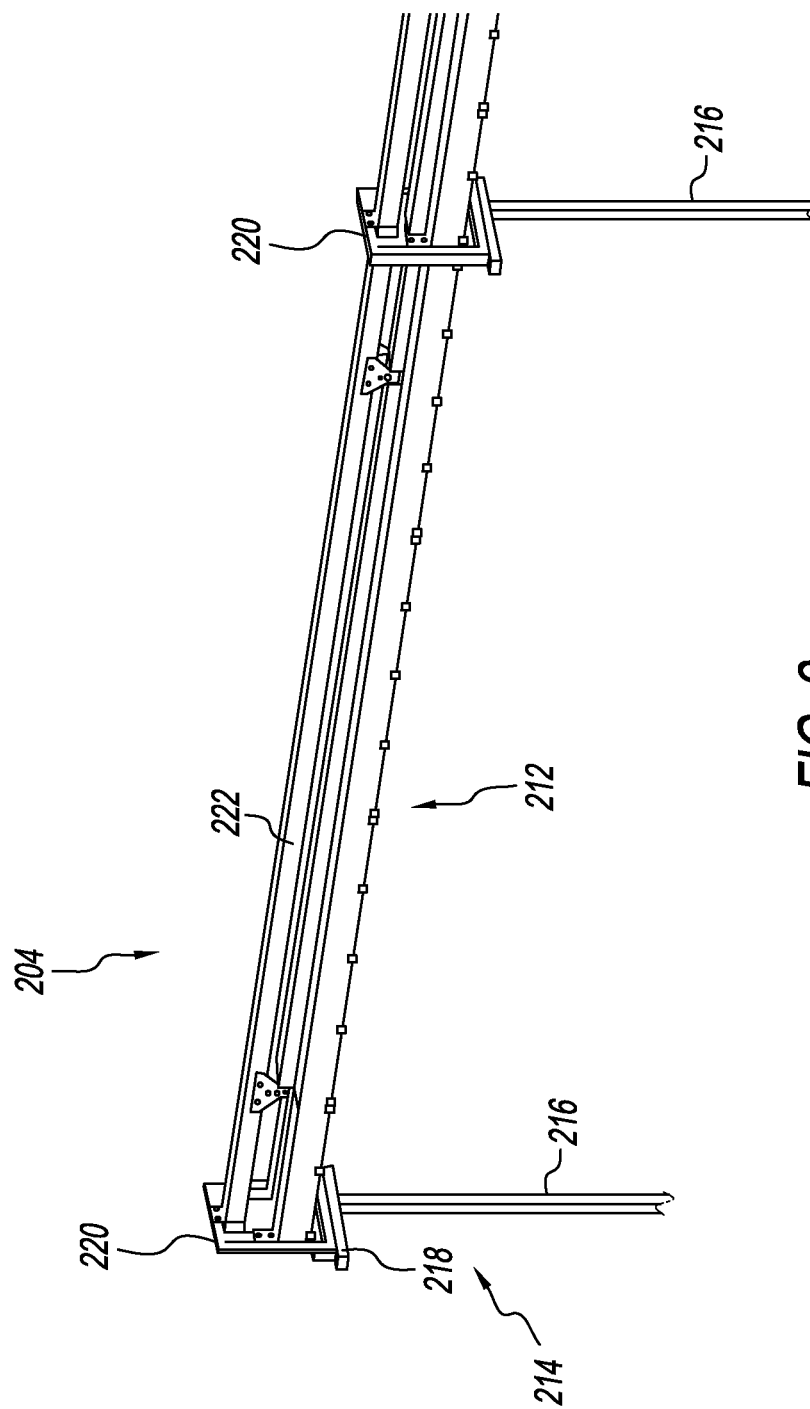
FIG. 2 shows a three-dimensional representation of the support frame of the receiver system according to the invention, with first and second suspensions.
Figure 3:
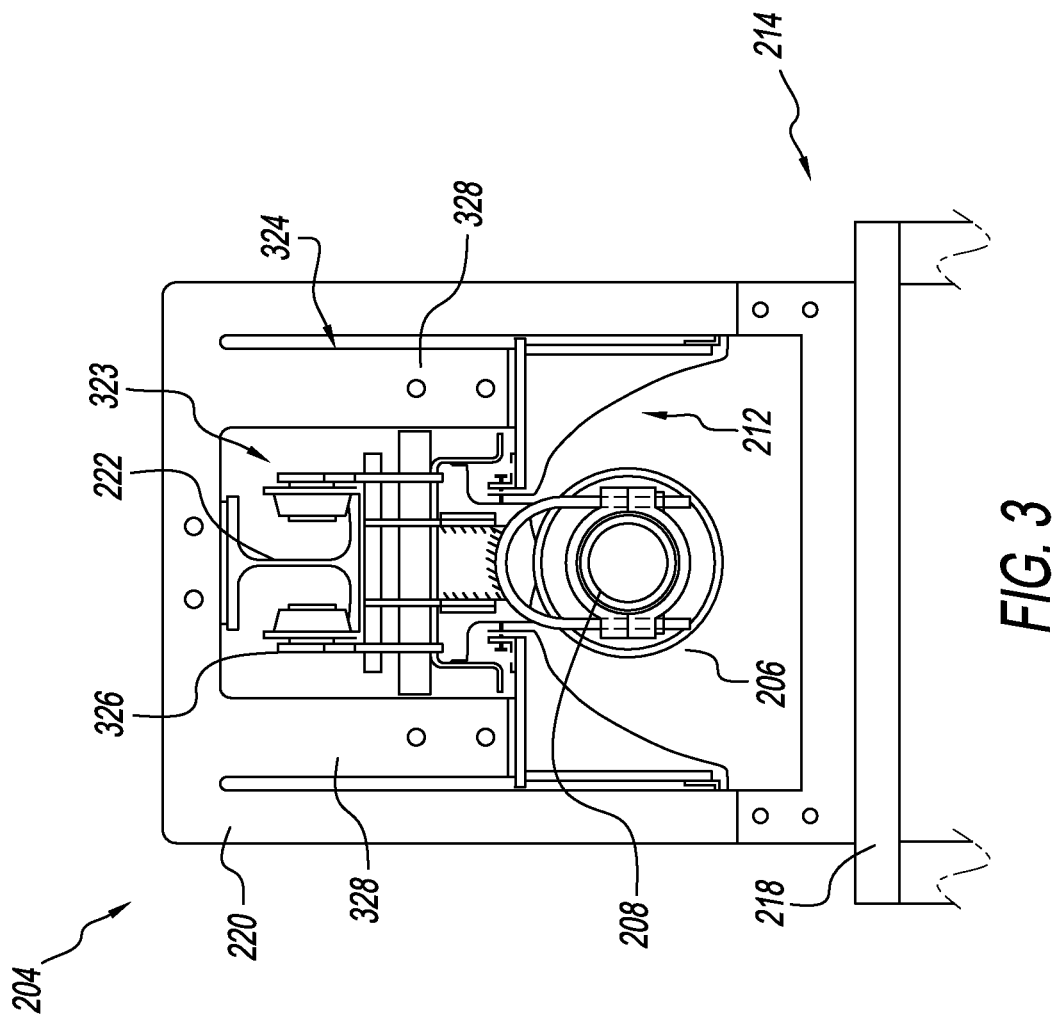
FIG. 3 shows an end view onto an example of embodiment of the receiver system according to the invention.

The invention will be explained first in more detail on the basis of FIGS. 2 and 3, whereby in FIG. 2 essential parts of the receiver system are omitted for purposes of clarity, these parts being explained with reference to the cross section in FIG. 3.

The receiver system 204 has a receiver tube 206 of the above-described type, a mirror array 212, and also a post 216 and a crosswise support 218 as parts of the support frame 214.

The support frame 214 further has a frame element 220, which connects the crosswise support 218 to a longitudinal support member 222 running above the receiver tube 206 and the mirror array 212. In addition, the support frame 214 has a first suspension 323 for holding the receiver tube 206 and a second suspension 324 for holding the mirror array or at least parts of the mirror array. The two suspensions 323 and 324 are disposed on the frame element 220, independent of one another.

More precisely, the first suspension 323 has first compensation means in the form of a trolley 326, which is disposed so as to be able to travel along the longitudinal support member 222 in the longitudinal direction. In this way, the longitudinal support member forms a rail guide for the first suspension that could compensate for an almost unlimited longitudinal expansion and thus takes into account the large expansion of the greatly heated absorber tube.

The second suspension 324 has second compensation means in the form of strips 328, which are joined in one piece at their fixed end to the frame element 220 of the support frame 214, and are connected on the other side at their free end to parts of the mirror array 212. The strips 328 each form a monolithic and flat solid unit in the longitudinal direction, i.e., crosswise to the plane of the illustration, thus defining one degree of freedom essentially in the longitudinal direction on their free end. In this way, the strips 328 form a first joint in the form of a solid joint, which could compensate for only a limited longitudinal expansion in the longitudinal direction, but which is sufficient for the relatively small expansion of the mirror array. Moreover, the deflection of the joint can be adjusted in principle in a simple way to the required expansion length by suitably selecting the length of the strips 328 and the distances from one another of the following two suspensions in the longitudinal direction or the length of the mirror elements disposed between them.

Figure 4:
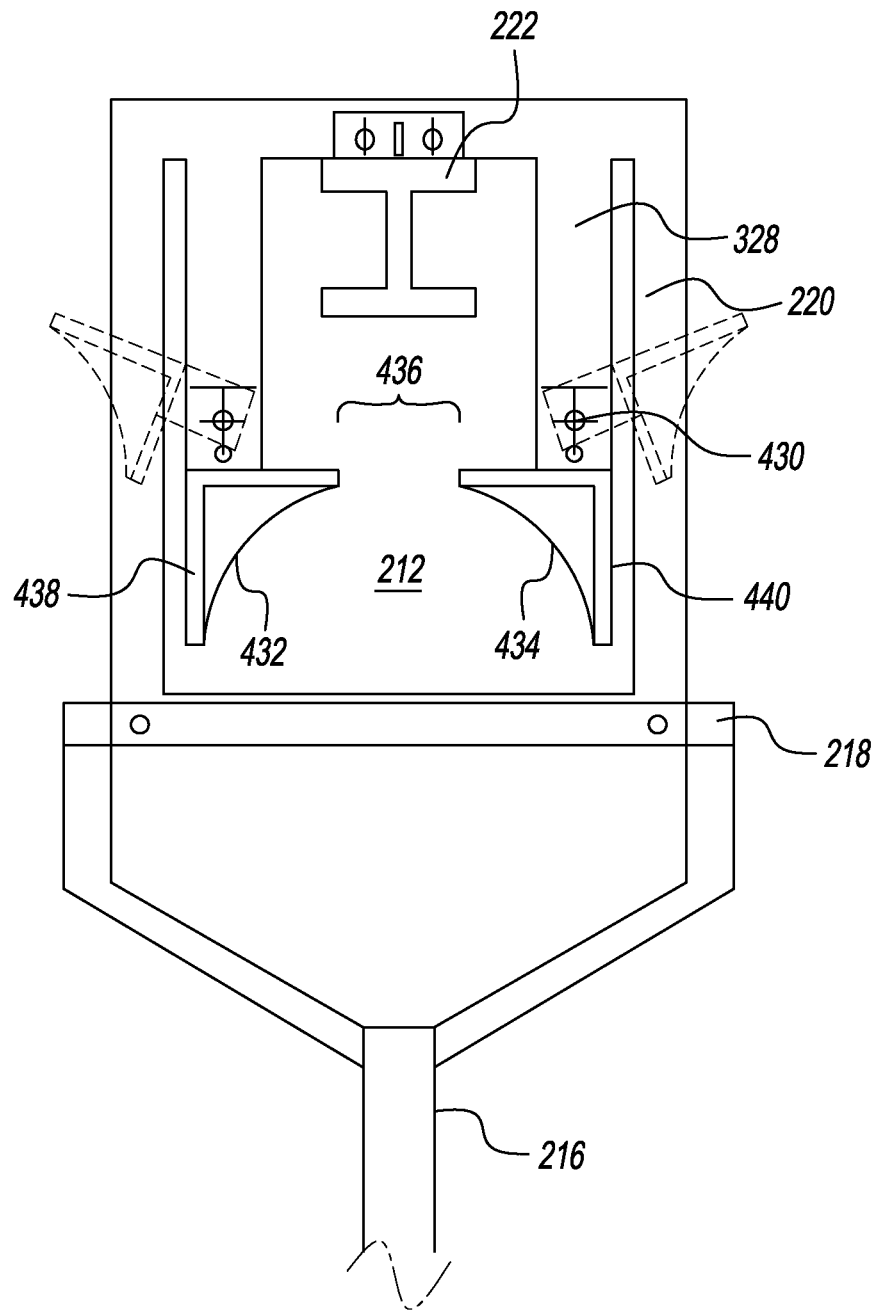
FIG. 4 shows an isolated representation of the support frame of the receiver system according to the invention in the end view.

Further details, in particular of the second suspension 324, will be explained in more detail based on FIG. 4. In addition to the strip 328 forming a first joint, the second suspension 324 has a second joint 430, which is formed as a rotating joint for swinging out the mirror array or parts of the mirror array crosswise to the longitudinal direction. The mirror array is shown in the operating position by means of solid lines and in the lateral and upwardly swung-out position for maintenance or revision by means of dotted lines. In the revision position, the mirror array releases the receiver tube disposed in the center (see FIG. 3) for an intervention on all sides, and, in particular, protects the sensitive mirror elements in this way from damage due to the intervention.

In the embodiment shown here, the mirror array has separate first and second mirror elements 432 and 434 having a gap 436 running in between them in the longitudinal direction. The gaps 436 also form an opening in the mirror array through which the first suspension 323 is guided from the longitudinal support member 222 to the receiver tube 206; see FIG. 3. In addition, the mirror array has a first and a second profile element 438, 440, each associated with the first or the second mirror element 432, 434, the profile element housing the associated mirror element on its side turned away from the receiver tube and thus protects it from weather effects and dust. The first and the second profile elements 438, 440 are both configured L-shaped.

Figure 5:
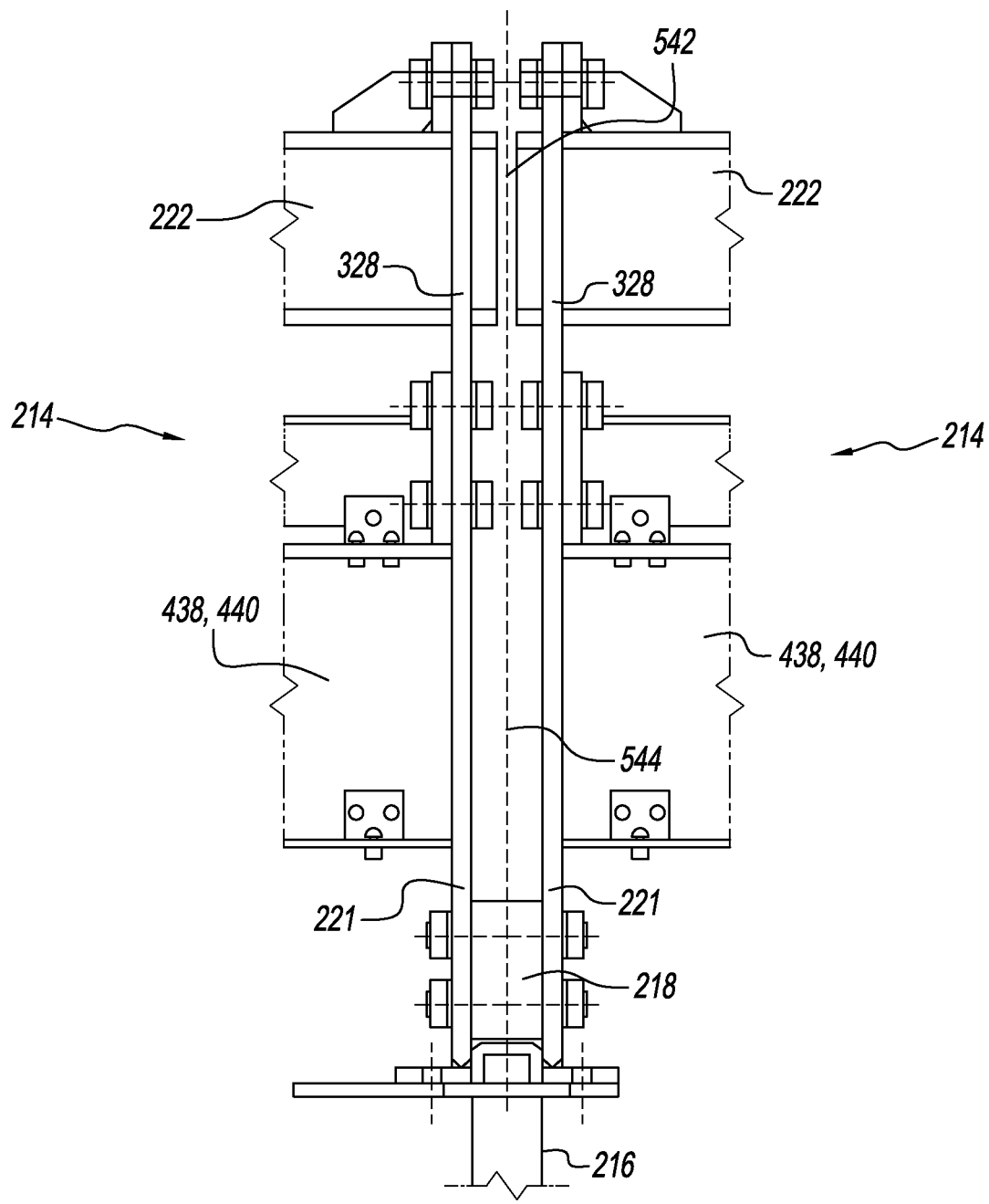
FIG. 5 shows a lateral view onto the detail of the support frame for illustration of the second suspension for holding the mirror array.

Further details, particularly of the support frame, can be recognized in FIG. 5. The latter shows the support frame in the region of the previously described frame element 220 above the support post 216. In the lateral view, it is shown that two segments of the support frame 214 are adjacent to one another in the region of the support post. Thus, a frame element 220 is screwed onto each side of the crosswise support 218, and each of these elements supports one of the adjacent segments of the support frame 214 on one side. This can be recognized in that a separate element of the longitudinal support member 222 is screwed to each of the two frame elements 220, whereby a joining 542 is formed between the two elements of the longitudinal support member 222. This joining serves as an expansion joint, since the elements of the longitudinal support member also expand during heating. However, unlike the case for known constructions, the longitudinal support member is not found inside a housing together with the optical elements greatly heated during operation, but rather is found above the housing of the mirror elements 430, 434, which lies underneath, so that a much smaller expansion reserve is sufficient.

In addition, it can be recognized that two sequential segments also meet up at this place with L-shaped profile elements 438 and 440 that are each suspended on one side on one of the two frame elements 220 by means of strips 328 belonging thereto. A joining 544 is formed in the longitudinal direction, both between the first and second profile elements (only one of which can be recognized in the illustration) and the associated first and second mirror elements (not recognizable), this joining having the function of an expansion joint.

Figure 6:
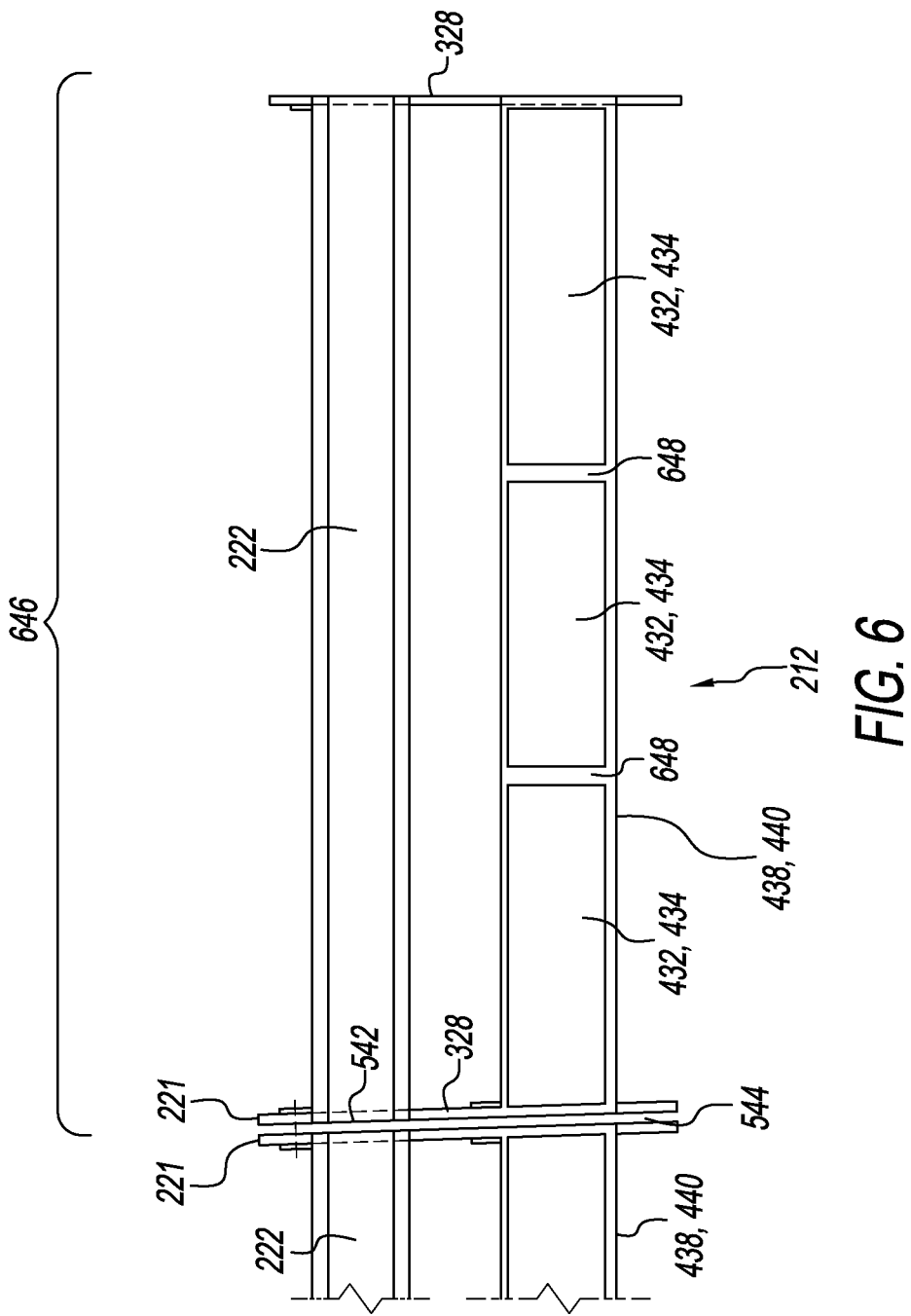
FIG. 6 shows a lateral view onto a segment of the receiver system for illustration of the mirror array.

A complete segment of the support frame between two adjacent support posts is shown as 646 in FIG. 6. A joining 542 can also be recognized here between two adjacent elements of the longitudinal support member 222 mounted on the same support post as well as a joining 544 between two adjacent profile elements 438 and 440. In addition, it can also be seen that several first and second mirror elements 432, 434 which are spaced at a distance in the longitudinal direction are disposed on the profile element 438 and analogous to the mirror-image profile element 440. Three mirror elements per profile element are illustrated, but the number can vary as desired. The joinings 648 which are formed in between each time within the same associated profile element serve once again as expansion joints and take into consideration the circumstance that temperature differences and expansion differences can also form, in particular during operation, between the mirror elements 432, 434, on the one hand, and the associated profile element, on the other hand. The first and second mirror elements 432, 434 are fixed to the associated first and second profile elements, thus preferably on one side in each case by means of compensation means, whereas they are connected rigidly to the profile element belonging thereto on the other side in each case in the longitudinal direction. The compensation means may comprise slots, for example.

Figure 7:
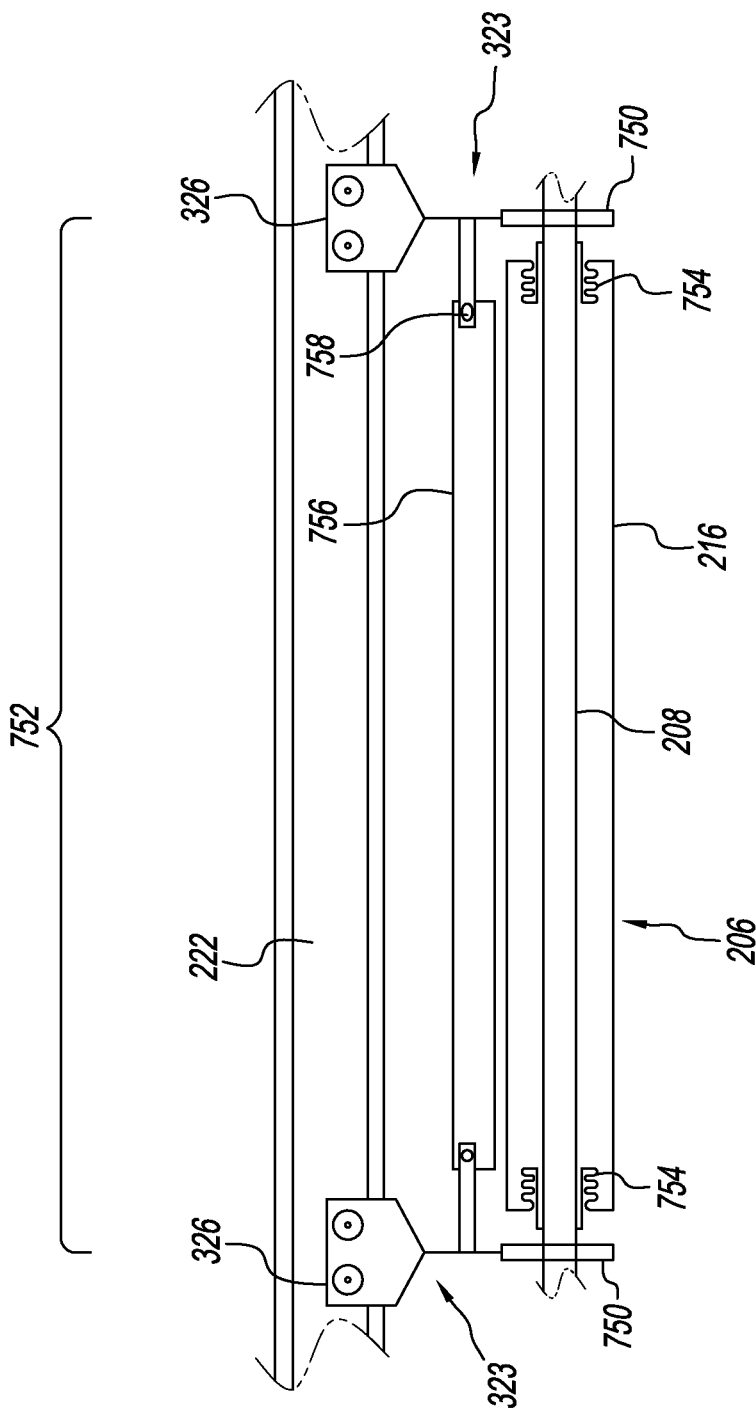
FIG. 7 shows a lateral view onto the detail of the receiver tube together with the first suspension of the receiver system.

FIG. 7 shows a schematically simplified representation of detail aspects of the first suspension in lateral view. The receiver tube 206, which is composed of the absorber tube 208 and the sleeve tube 210 concentrically surrounding it on a longitudinal segment, can be seen. The sleeve tube 210 is connected at both ends to the absorber tube 208 by means of known compensation elements in the form of expansion bellows 754.

It is clear here that the receiver tube 206 also has a segmentation that is predetermined by the length of the sleeve tube 210, whereas the absorber tube 208 continues without break (almost endlessly). Of course, this must be the case, since the fluid transporting the heat can flow unhindered through the absorber tube 208 from one end to the other. A gap that serves on one side as expansion compensation for the sleeve tube and in which, on the other side, a short section of the absorber tube lies free on which the first suspension 323 engages on its free end with a clip 750 for fastening the absorber tube 208 is left each time between two adjacent sleeve tubes 210. The longitudinal support member 222, on which the first suspension 323 having a trolley 326 as the first compensation means is disposed so that it can travel in the longitudinal direction, is in turn again shown above the receiver tube 206.

In this construction, the sleeve tube 210 moves relative to the longitudinal support member 222 with a longitudinal expansion of the absorber tube 208. A differential length change of the absorber tube 208 relative to the sleeve tube 210, based on different heating and different materials, is made possible by the expansion bellows 754 alone.

In the comparison of FIGS. 6 and 7, it is also clear that the suspension and segment length of the receiver tube is independent from the suspension of the mirror array and segment length of the longitudinal support member, profile elements or mirror elements.

In addition, a third profile element 756 for a third mirror element (which cannot be recognized here) is shown in FIG. 7 directly above the receiver tube 206, which is fastened to the first suspension 323 on both sides. The third profile element 756 is connected on one side by means of compensation means, here in the form of a slot 758, and on the other side, it is connected rigidly to the associated first suspension 323, thus permitting a different lengthwise expansion of the absorber tube 208 on one side and of the profile element 756 on the other side.

Figure 8:
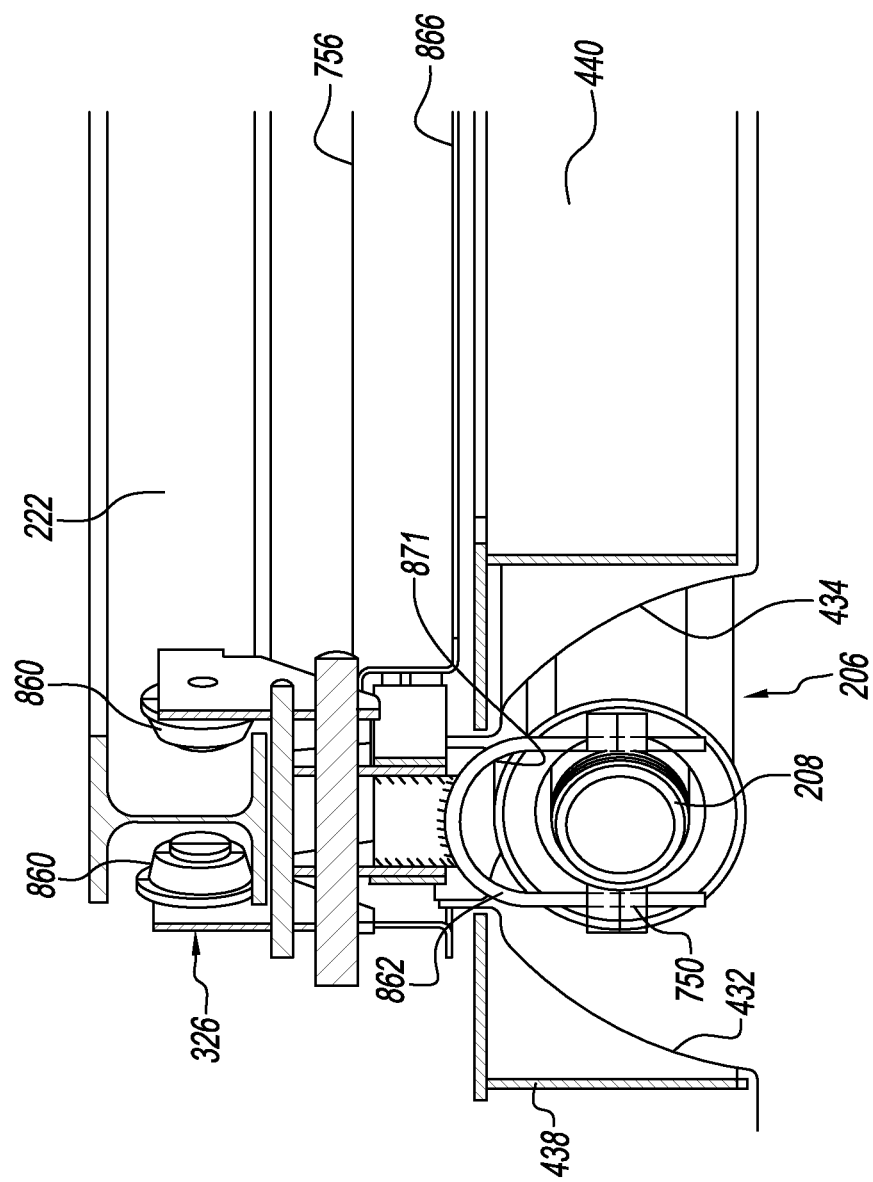
FIG. 8 shows a perspective representation of the detail of the first suspension.

Further details, in particular of the first suspension 323, are shown in FIG. 8, in which this is shown in section and in perspective. The first suspension 323, as stated, has on its upper end a trolley 326, which is suspended by means of two pairs of rollers 860, only one of which can be seen in the half section, and which can travel in the longitudinal direction on the longitudinal support member 222. On its lower end, the trolley 326 is connected by means of a bracket 862 to the clips 750, which fix in place the absorber tube 208.

In this illustration, the third profile element 756, which houses the third mirror element 871 on its side facing away from the receiver tube 206, can be well recognized. The third profile element 756 is configured essentially U-shaped for this purpose, whereby it has at the ends of its two legs, lateral projections 866, which form a covering with the L-shaped first and second profile elements 438 and 440. The mirror array lying thereunder, which is composed of the first, second and third mirror elements 432, 434, 871, is sufficiently protected in this way from environmental effects and dust.

Figure 9:
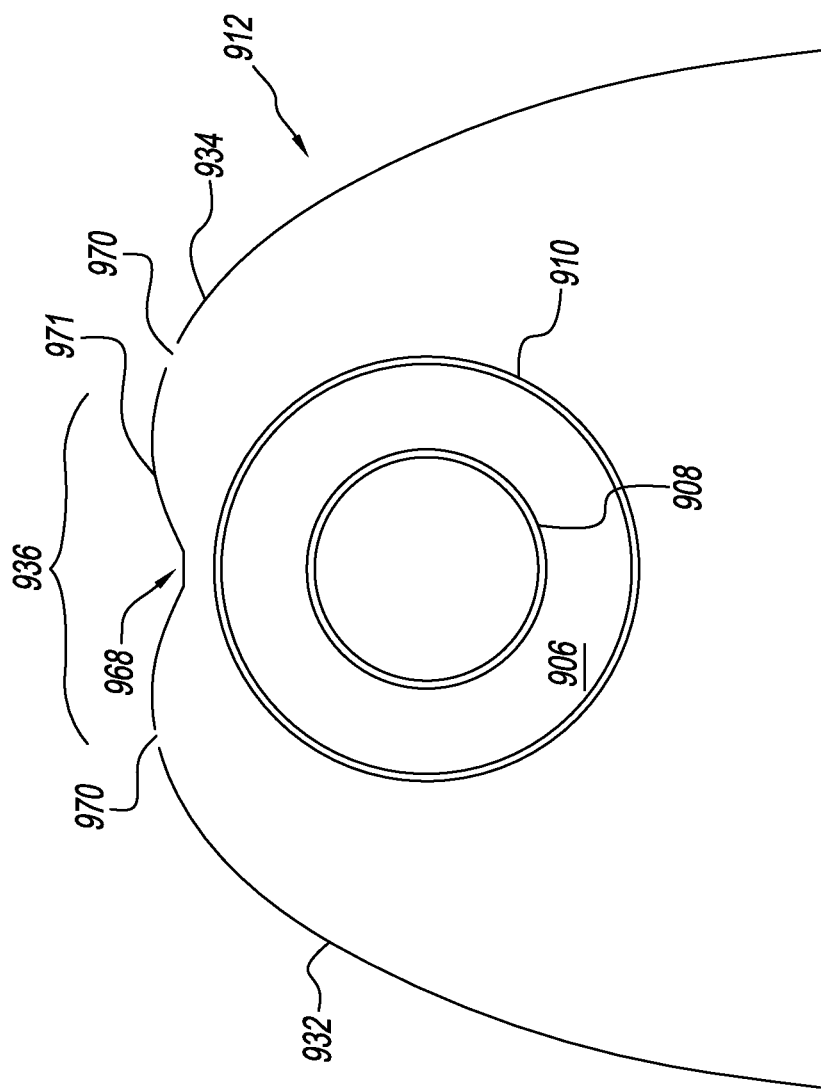
FIG. 9 shows a schematic cross section through the receiver system in a first embodiment for illustration of a divided mirror array.

FIG. 9 shows, in a schematically very simplified form, the optical components of the receiver system according to the invention according to a first embodiment. The receiver tube 906 having an absorber tube 908 and a sleeve tube 910, which surrounds the absorber tube 908 concentrically, can be seen therein. Also counted among the optical components is the mirror array 912 above the receiver tube 906, which is separated in the longitudinal direction into the two first and second mirror elements 932 and 934 with a gap 936 lying in between, directly over the receiver tube 906, which is closed optically at least partially by a mirror segment 968. Closed optically at least partially in this case means that, considered in cross section, an air gap 970 remains between the first mirror element 932 and the mirror segment 968 as well as between the second mirror element 934 and the mirror segment 968.

The gap 936 between the first and the second mirror elements 932 and 934 serves as the opening through which the first suspension is guided from the longitudinal support member (which is not shown here) above the optical components to the receiver tube. In this way, it is possible to form the first suspension for holding the receiver tube 906 and the mirror segment 968 independently from the second suspension for holding parts of the mirror array, i.e., the first and the second mirror elements 932, 934, so that they permit different expansions of the absorber tube 908 on one side and the first and second mirror elements 932, 934 on the other side.

In this embodiment, the mirror segment 968 is formed as a third mirror element 971, which is positioned without direct contact with the sleeve tube 910 and above it.

Figure 10:
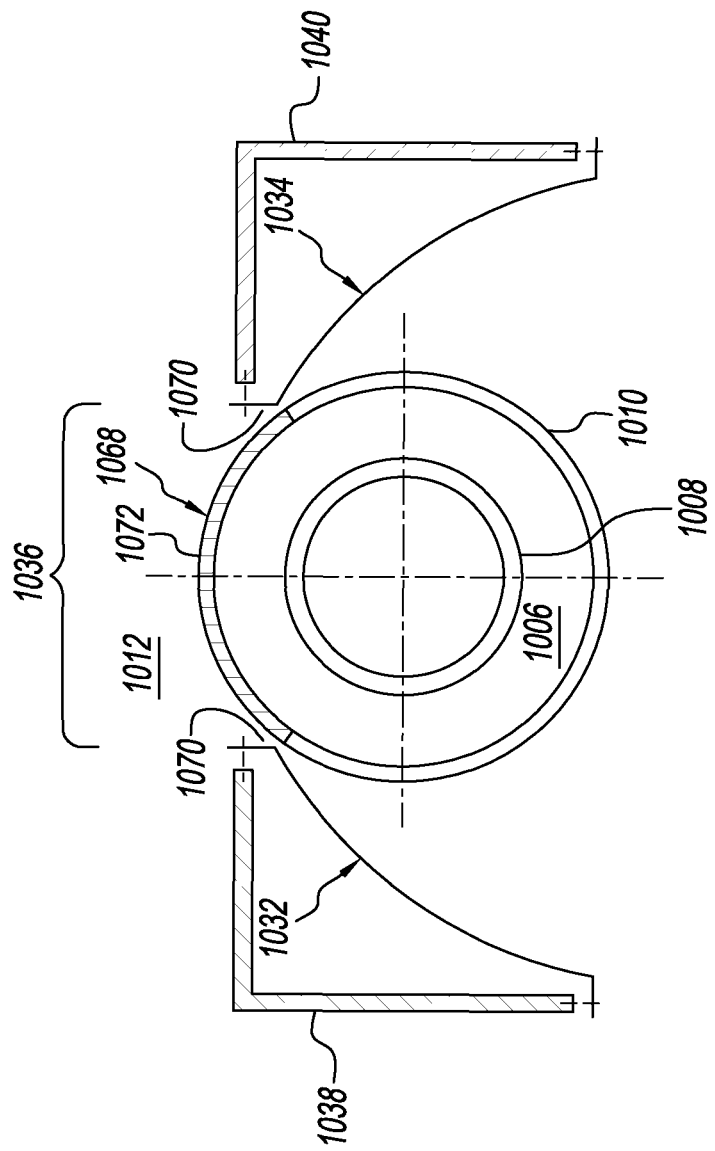
FIG. 10 shows a schematic cross section through a second embodiment of the receiver system for illustration of an alternative division of the mirror array.

FIG. 10 shows a second variant of embodiment of the optical components of the receiver system according to the invention. This variant has a receiver tube 1006 composed of an absorber tube 1008 and a sleeve tube 1010 as well as a mirror array 1012 composed of a first mirror element 1032, a second mirror element 1034 and a mirror segment 1068, which at least partially optically closes the gap 1036 between the first and the second mirror segments. An essential difference from the embodiment example according to FIG. 9 consists in the fact that the mirror segment 1068 is formed as a reflective surface 1072 of the sleeve tube 1010. This variant of embodiment has the advantage of a simpler construction, since the third mirror element together with its fastening can be omitted, because here the mirror segment forms an integral component of the receiver tube and thus is also always automatically guided together with the receiver tube.

In addition, in this embodiment, air gaps 1070 can also be recognized between the first mirror element 1032 and the mirror segment 1068 as well as between the second mirror element 1034 and the mirror segment 1068.

Finally, a first profile element 1038, which is associated with the first mirror element 1032, and a second profile element 1040, which is associated with the second mirror element 1034, are shown in FIG. 10. The two profile elements 1038 and 1040 are configured L-shaped and house the first and second mirror elements on their side facing away from the receiver tube 1006.

Figure 11:
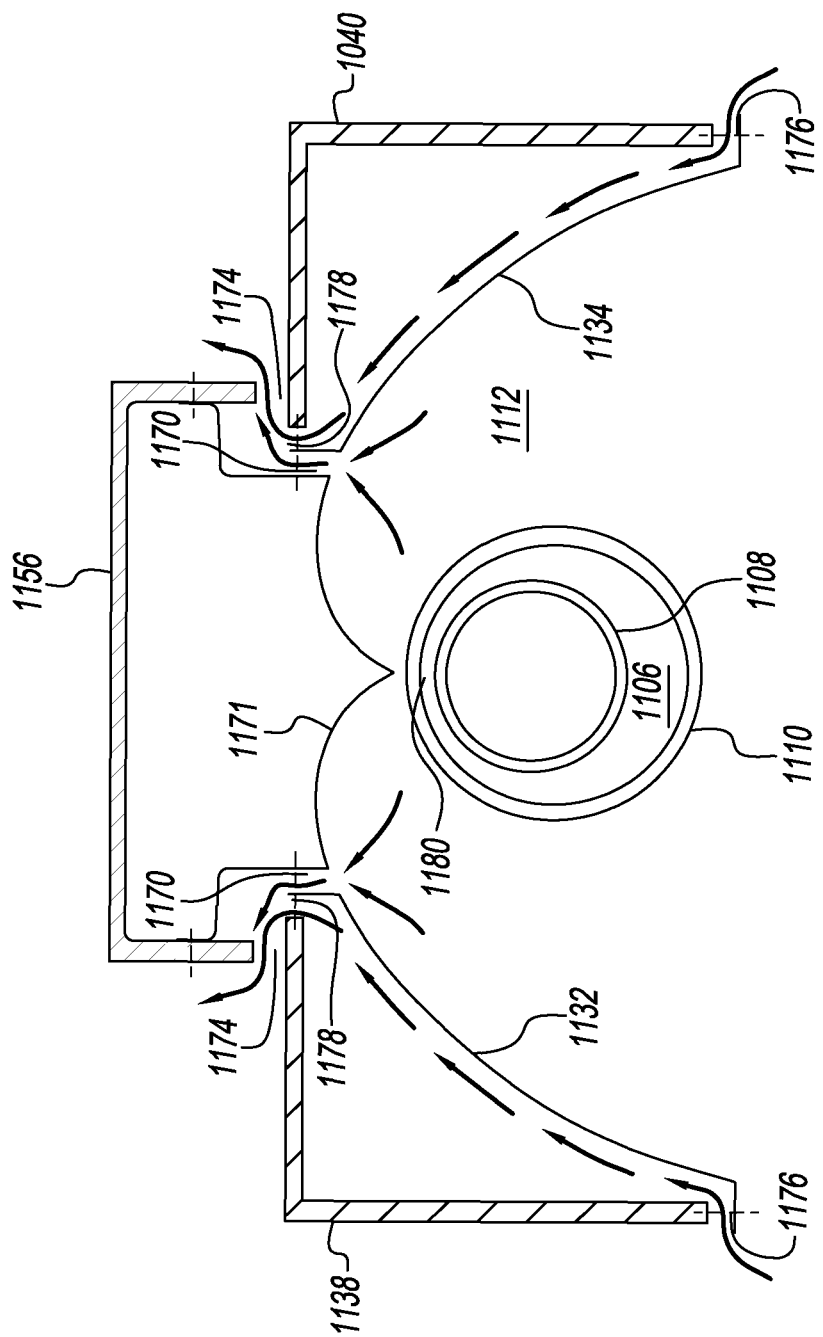
FIG. 11 shows a schematic cross section through the receiver system similar to the embodiment according to FIG. 9 for illustration of an aeration of the mirror elements.

A third embodiment of the optical components of the receiver system according to the invention is shown schematically in FIG. 11. With respect to the mirror array 1112, this essentially corresponds to the embodiment of FIG. 9. As it was therein, the mirror array is composed of a first, a second, and a third mirror element 1132, 1134, and 1171.

A difference from the example of embodiment in FIG. 9 consists of a modified shape of the receiver tube 1106, in which the absorber tube 1108 is disposed eccentrically in the sleeve tube 1110. Stated more precisely, the absorber tube 1108 is shifted up, so that the gap between the lateral surface of the absorber tube 1108 and the lateral surface of the sleeve tube 1110 is reduced on the upper side facing the third mirror element 1171. In this way, radiation losses are minimized; see also FIG. 12A.

In addition, a first profile element 1138, which is associated with the first mirror element 1132; a second profile element 1140, which is associated with the second mirror element 1134; and a third profile element 1156, which is associated with the third mirror element 1171, are illustrated in FIG. 11. The two first and second profile elements 1138, 1140 are L-shaped and house the associated first and second mirror elements. The third profile element 1156 is U-shaped and houses the third mirror element 1171 on its side facing away from the receiver tube 1106. At the same time, the three profile elements overlap in such a way that the mirror elements and the receiver tube are protected on the upper side against environmental effects, such as precipitation, sunlight, wind or dust, for example. A further protection can be achieved in a way known in and of itself by suitable beading of the edges as well as the lateral projection, which is not shown here (compare FIGS. 3 and 8).

Further, it is illustrated in FIG. 11 that the entire mirror array has a plurality of air gaps. On the one hand, these are the air gaps 1170 between the first and the second mirror elements 1132, 1134 on one side and the mirror segment formed in the shape of the third mirror element 1171, which have already been discussed above. Another air gap is formed between the first profile element 1138 and the third profile element 1156 as well as, symmetrically thereto, between the second profile element 1140 and the third profile element 1156.

It can also be recognized that the mirror array in cross section has a mirror-symmetrical curve profile with two apical points lying on top, whereby the air gaps 1170 are each found in the region of these apical points. "In the region of the apical points" also includes a region underneath the apical point, or here the apical points, of the curve profile of up to 10% of the total height of the curve profile. In any case, the air gaps 1170 disposed in the region of the apical points contribute to the fact that rising hot air does not build up in the mirror array but can be drawn off upward through the air gaps, so that the temperature fluctuations to which the individual mirror elements are subjected can be reduced.

So that the rising hot air can completely exit the housing formed from the three profile elements 1138, 1140, and 1156, the gaps 1174 are provided on both sides between the profile elements. An exhaust air flow is characterized by means of arrows.

Additional gaps are found between the first and second mirror elements 1132 and 1134 and the associated profile elements 1138 and 1140. Here, the gaps 1176 are found on the lower end and the gaps 1178 are found on the upper end, permitting an air circulation also on the outer side of the mirror elements 1132 and 1134, so that an optimal cooling of these mirror elements is assured.

FIGS. 12A and 12B show two different embodiments of modified receiver tubes 1206 and 1206'. Each of these has a structurally identical absorber tube 1208, but different sleeve tubes 1210 and 1210'. The sleeve tube 1212 is offset in a central segment of the receiver tube, so that the absorber tube 1208 runs eccentrically in the sleeve tube 1212 in this segment. Different from this, the sleeve tube 1210' according to FIG. 12B is only tapered in this segment, the absorber tube 1208 and the sleeve tube 1210' thus forming a concentric arrangement. Both variants have as a consequence the fact that the gaps 1280 and 1280' between the absorber tube and the sleeve tube taper in the longitudinal direction of the central segment of the receiver tube on its upper side, so that a smaller radiation loss occurs at this site, as was already explained on the basis of FIG. 11. Both measures, an offset sleeve tube and a tapered sleeve tube, can also be basically combined.

Moreover, the connection between the absorber tube 1208 and the sleeve tube 1210 or 1210', which is configured identically in both cases, can be recognized. It provides for a sealing of the volume enclosed by the sleeve tube 1210 or 1210', which is usually evacuated. In addition to sealing, the connection 1282 simultaneously has the function of an expansion compensation. Thus it has an expansion bellows in a way known in and of itself.

It will still be noted by way of explanation that the FIGS. 12A and 12B show an end segment of the receiver tube, which continues toward the left and has a mirror-reversed closure on the opposite-lying side.

Figure 13:
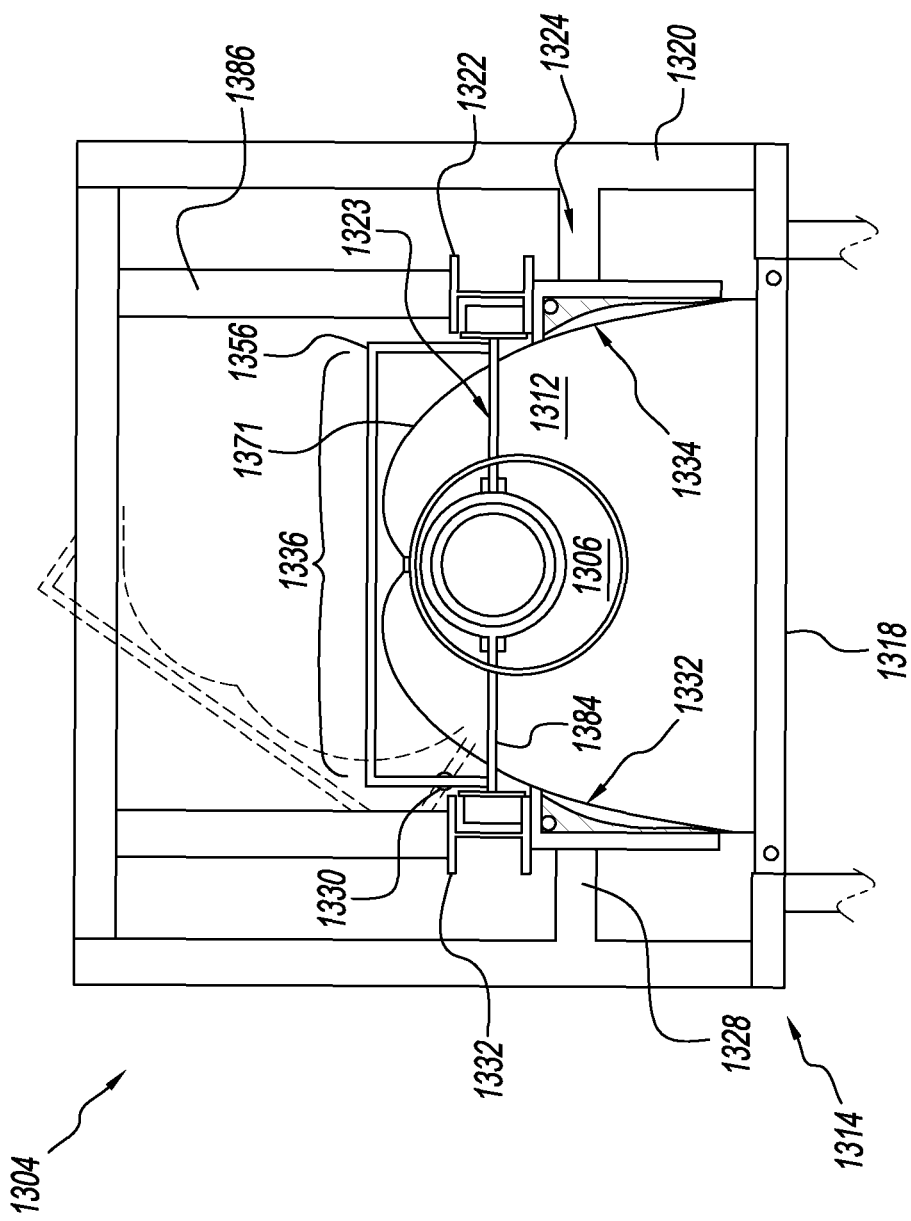
FIG. 13 shows an end view onto an alternative embodiment of the receiver system according to the invention.

FIG. 13 shows a second embodiment of the receiver system 1304 according to the invention, having a receiver tube 1306 of the type described above. Essential differences compared to the embodiment discussed above are to be found in the configuration of the mirror array 1312, the support frame 1314, and the first and second suspensions, and only these differences will be discussed below.

The support frame 1314 has a crosswise support 1318 and a frame element 1320 attached thereon. In addition, the support frame 1314 has a first suspension 1323 for holding the receiver tube 1306 and a second suspension 1324 for holding the mirror array 1312, more precisely, a first and a second mirror element 1332, 1334, and the associated first and second profile elements 1338, 1340. The two suspensions 1323 and 1324 are connected to the frame element 1320 independently from one another. Two longitudinal support members 1322 running parallel to the receiver tube 1306 and the mirror array 1312, but this time horizontally in addition, are also part of the support frame 1314.

The first suspension 1323 has first compensation means in the form of a carriage, preferably with two pairs of rollers, the carriage being guided so that it can travel in the longitudinal direction by the pair of rails formed by the two longitudinal support members 1322.

The second suspension 1324 has second compensation means in the form of strips 1328, which once again form solid joints between the frame element 1320 and the mirror elements 1332, 1334, but unlike the previously described examples, these run horizontally.

The first and second mirror elements 1332 and 1334, which are separate in the longitudinal direction, form a gap 1336 lying between them. The gap 1336 forms an opening through which the first suspension 1323 is guided from the longitudinal support members 1322 to the receiver tube 1306 in the form of opposite-lying axes 1384.

The longitudinal support members 1322 are in turn suspended on the frame element 1320, each by means of a strip 1386, so that the strips 1386 form a solid joint, which makes possible a compensation movement of the longitudinal support member in the longitudinal direction.

The first suspension 1323 further has a second joint 1330, which is formed as a rotating joint for swinging out the mirror array, more precisely a third mirror element 1371 plus the U-shaped third profile element 1356 housing it, crosswise to the longitudinal direction. The third profile element 1356 and the third mirror element 1371 contact parts of the carriage and are thus guided together with the movement of the receiver tube 1306. They are shown in the operating position by means of solid lines and in the lateral and upwardly swung-out position for maintenance or revision by means of dotted lines. In the revision position, the mirror array releases the receiver tube disposed in the center for an intervention from the top.

LIST OF REFERENCE CHARACTERS

100 Fresnel solar plant
102 Primary concentrator mirror
104 Receiver system
106 Receiver tube
108 Absorber tube
110 Sleeve tube
112 Mirror array
114 Support frame
116 Support post
118 Crosswise support
204 Receiver system
206 Receiver tube
208 Absorber tube
210 Sleeve tube
212 Mirror array
214 Support frame
216 Support post
218 Crosswise support 220 Frame element
222 Longitudinal support member
323 First suspension
324 Second suspension
326 Trolley
328 Strip
430 Second joint, rotating joint
432 First mirror element
434 Second mirror element
436 Gap, opening
438 First profile element
440 Second profile element
542 Joining between adjacent elements of the longitudinal support member
544 Joining between adjacent profile elements
646 Segment of the support frame
648 Joining between adjacent mirror elements
750 Clip
752 Segment of the first suspension
754 Expansion bellows
756 Third profile element, U-profile
758 Compensation means
860 Pair of rollers
862 Bracket
866 Lateral projection
871 Third mirror element
906 Receiver tube
908 Absorber tube
910 Sleeve tube
912 Mirror array
932 First mirror element
934 Second mirror element
936 Gap, opening
968 Mirror segment
970 Air gap
971 Third mirror element
1006 Receiver tube
1008 Absorber tube
1010 Sleeve tube
1012 Mirror array
1032 First mirror element
1034 Second mirror element
1036 Gap, opening
1038 First profile element
1040 Second profile element
1068 Mirror segment
1070 Air gap
1072 Reflective surface
1106 Receiver tube
1108 Absorber tube
1110 Sleeve tube
1112 Mirror array
1132 First mirror element
1134 Second mirror element
1138 First profile element
1140 Second profile element
1156 Third profile element
1170 Air gap
1171 Third mirror element
1174 Air gap
1176 Air gap
1178 Air gap
1180 Gap between absorber tube and sleeve tube
1206 Receiver tube
1206' Receiver tube
1208 Absorber tube
1208' Absorber tube
1210 Sleeve tube
1210' Sleeve tube
1280 Gap between absorber tube and sleeve tube
1280' Gap between absorber tube and sleeve tube
1282 Connection
1304 Receiver system
1306 Receiver tube
1312 Mirror array
1314 Support frame
1318 Crosswise support
1320 Frame element
1322 Longitudinal support member
1323 First suspension
1324 Second suspension
1328 Strip, solid joint
1330 Second joint
1332 First mirror element
1334 Second mirror element
1336 Gap, opening
1338 First profile element
1340 Second profile element
1356 Third profile element
1371 Third mirror element
1384 Axis
1386 Strip, solid joint

What is claimed is:

1. A receiver system for a Fresnel solar plant, comprising:
an absorber tube defining a longitudinal direction;
a mirror array parallel to the longitudinal direction for the concentration of light beams on the absorber tube;
a support frame for the absorber tube and the mirror array;
a first suspension that holds the absorber tube; and
a second suspension that holds or at least parts of the mirror array, the first and second suspensions being mounted on the support frame independent of one another, the first suspension having a first compensation device and the second suspension having second compensation device, and the first and second compensation devices permit different expansions of the absorber tube and at least parts of the mirror array in the longitudinal direction, wherein the mirror array has separate first and second mirror elements in the longitudinal direction with a gap lying between the first and second mirror elements, and wherein the mirror array has a first profile element and a second profile element that are associated with the first and second mirror elements, respectively, wherein the first and second profile elements housing the first and second mirror elements, respectively, on a side facing away from the absorber tube.

2. The receiver system according to claim 1, further comprising a receiver tube composed of the absorber tube and a sleeve tube disposed around the absorber tube at least in segments.

3. The receiver system according to claim 1, wherein the support frame has a longitudinal support member on which the first suspension is mounted and which runs parallel to the absorber tube and to the mirror array.

4. The receiver system according to claim 3, wherein the first suspension is guided from the longitudinal support member through an opening in the mirror array to the absorber tube.

5. The receiver system according to claim 1, wherein the first and the second profile elements are L-shaped.

6. The receiver system according to claim 1, wherein the first and second profile elements are fastened to the second suspension.

7. The receiver system according to claim 1, wherein the first and second mirror elements are fixed in place in each case by a compensation device, at least on one side, to the associated first and second profile elements, the compensation device permitting different expansions of the mirror elements and the associated profile elements in the longitudinal direction.

8. The receiver system according to claim 1, wherein the mirror array has a mirror segment, which at least partially optically closes the gap.

9. The receiver system according to claim 8, wherein the mirror segment is formed as a third mirror element.

10. The receiver system according to claim 9, wherein the mirror array has a third profile element associated with the third mirror element, the third profile element housing the third mirror element on a side facing away from the absorber tube.

11. The receiver system according to claim 10, wherein the third profile element is U-shaped.

12. The receiver system according to claim 10, wherein the third profile element is fastened to the first suspension.

13. The receiver system according to claim 10, wherein the third mirror element is fixed in place to the third profile element by a third compensation device, at least on one side, the third compensation device permitting different expansions of the third mirror element and the third profile element in the longitudinal direction.

14. The receiver system according to claim 8, further comprising a receiver tube composed of the absorber tube and a sleeve tube disposed around the absorber tube at least in segments, wherein the mirror segment is formed as a reflective surface of the sleeve tube.

15. The receiver system according to claim 8, further comprising an air gap between the first mirror element and the mirror segment and between the second mirror element and the mirror segment.

16. The receiver system according to claim 15, wherein the mirror array has a mirror-symmetrical curve profile with at least one top-lying apical point, and the air gap is disposed in a region of the apical point.

17. The receiver system according to claim 1, wherein the second suspension has, as the second compensation device, a first joint, which connects the support frame on one side to the mirror array or at least to parts of the mirror array on the other side and defines one degree of freedom in the longitudinal direction.

18. The receiver system according to claim 17, wherein the first joint is a solid joint.

19. The receiver system according to claim 1, wherein the first suspension has, as a first compensation device, a bearing arrangement that can travel along the longitudinal support member.

20. The receiver system according to claim 1, wherein the second suspension has a second joint, which connects the support frame on one side to the mirror array or at least to parts of the mirror array on the other side and defines one degree of freedom crosswise to the longitudinal direction.

21. The receiver system according to claim 20, wherein the second joint is a rotating joint for swinging out the mirror array or at least parts of the mirror array.

22. The receiver system according to claim 2, wherein the sleeve tube is disposed eccentrically around the absorber tube, at least on a central longitudinal segment.

23. The receiver system according to claim 2, wherein the sleeve tube is tapered at least on a central longitudinal segment.

* * * * *